United States Patent

Karol

[15] 3,650,021

[45] Mar. 21, 1972

[54] METHOD OF MANUFACTURING A TUBULAR PRINTED CIRCUIT ARMATURE

[72] Inventor: Kenneth N. Karol, Boulder, Colo.

[73] Assignee: International Business Machines Corporation, Armonk, N.Y.

[22] Filed: Aug. 26, 1970

[21] Appl. No.: 66,938

[52] U.S. Cl. ....................................29/598, 29/625, 310/266

[51] Int. Cl. ....................................H02k 15/02, H02k 15/10

[58] Field of Search ................29/596, 598, 625; 310/42, 43, 310/261, 264, 266

[56] References Cited

UNITED STATES PATENTS

| | | | |
|---|---|---|---|
| 3,312,846 | 4/1967 | Henry-Baudot | 310/266 |
| 3,512,251 | 5/1970 | Kitamori et al. | 29/598 X |
| 3,532,916 | 10/1970 | Fisher | 310/266 X |

*Primary Examiner*—John F. Campbell
*Assistant Examiner*—Carl E. Hall
*Attorney*—Hanifin and Jancin and Francis A. Sirr

[57] ABSTRACT

A tubular printed circuit armature, for use in an electric machine, is produced from two flexible cards, each card having a layer of conductive metal and a layer of insulation, such as a fully-cured epoxy-impregnated fiberglass layer. The layer of insulation is patterned in a predetermined manner to expose spaced bands of metal on the insulation side of each card, as by printed circuit techniques, so that interconnecting tabs of the winding conductors extend into the spaced bands of metal. The mating surfaces of the cards are then coated with an adhesive which will subsequently bond the cards together under a heat and pressure environment. The cards are then rolled about a high temperature coefficient mandrel, with the interconnecting tabs of one card in registry with the interconnecting tabs of the other card, and with the cards axially overlapping one another at the ends which form the axial seam of the tubular armature. The mandrel is then placed in a low temperature coefficient shell; and the shell is subjected to an elevated temperature, to thus form a unitary tube out of the two cards. The tube is then removed and the tabs are electrically connected to form the armature winding.

14 Claims, 4 Drawing Figures

INVENTOR
KENNETH N. KAROL

BY

ATTORNEY

METHOD OF MANUFACTURING A TUBULAR PRINTED CIRCUIT ARMATURE

BACKGROUND AND SUMMARY OF THE INVENTION

The present invention relates to the general field of low inertia armatures for electric machines. Such armatures usually consist of an electrically nonconductive, or insulating, carrier on which a conductive armature winding pattern is formed. The prior art teaches two general methods of forming this winding. In one method, the winding is formed in a metal sheet and then attached to the insulating carrier. In another method, the winding is formed after the layer has been attached to the carrier. These prior art armatures may be either of the disk or tube type.

The present invention relates to a method of making a tube type armature.

Prior art tubular armatures have been made by utilizing flat metal-insulator cards, then forming a portion of the winding in each metal layer while the card is in the flat state, then forming the cards into tubes, then assembling the tubes into a unitary tube, and then forcing adhesive between the tubes. The present invention relates to an improved method of this general type.

The present invention provides a unique combination of manufacturing steps which lower the cost and improve the yield of the manufacturing process. Specifically, the present invention includes the fundamental steps of preparing at least two laminated metal-insulator cards such that spaced surfaces of clean exposed metal appear on the insulator side of the cards; coating at least one side of one card with a temperature activated adhesive; placing the cards about a tubular mandrel such that the adhesive is between the cards; with the cards overlapping at their mating ends and with the spaced surfaces of metal in the cards in registry; placing the mandrel, with the cards loosely wrapped therein, into an encircling shell which has a temperature coefficient of expansion different from that of the mandrel; subjecting the shell and mandrel to an elevated temperature, whereupon the cards are forced together mechanically and the adhesive is set or activated; and then removing the resulting tubular structure. The present invention thus utilizes the unique combination of an adhesive and a jig or fixture which are activated by an elevated temperature.

Additional steps of the present invention include, without limitation, the step of forming a portion of the armature winding in each card, while the card is in the flat state, each winding conductor terminating in interconnecting tabs which are located in the above mentioned spaced metal surfaces; the step of coating the interconnecting tabs with a solder-like material such that the tabs in one card are interconnected to the tabs in the other card while in the shell; the step of forming manufacturing holes in selvage material of each card to facilitate the proper positioning of the cards on the mandrel; and the step of electroplating a commutator section on the finished tubular armature, prior to removal of the selvage material.

The foregoing and other objects, features, and advantages of the invention will be apparent from the following more particular description of preferred embodiments of the invention, as illustrated in the accompanying drawings.

DESCRIPTION OF THE PREFERRED EMBODIMENTS

Figure 1:
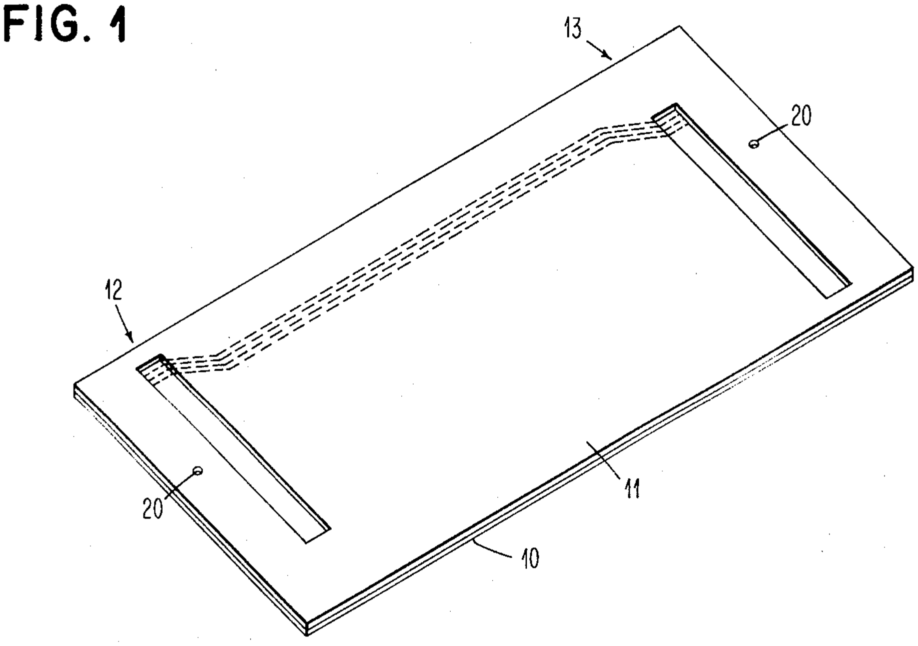
FIG. 1 is a view of one form of flat laminated card which may be used in the practice of the present invention, showing the spaced metal surfaces and the manufacturing holes.
Figure 2:
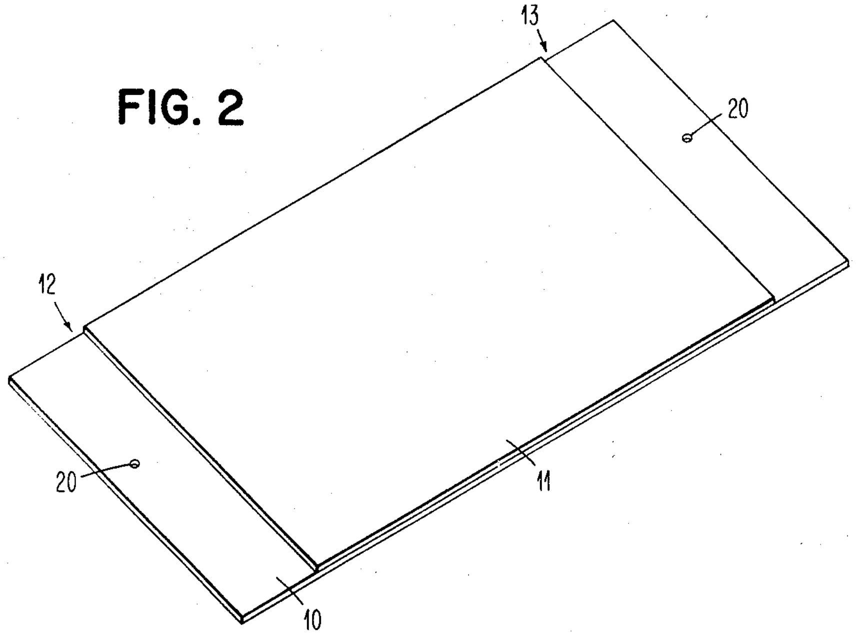
FIG. 2 is a view of another form of flat laminated card.

Referring to FIGS. 1 and 2, flat laminated cards are prepared with a solid sheet of conductive metal 10, for example copper, laminated to a layer of fully cured epoxy-fiberglass 11. By way of example, copper layer 10 may have a thickness of 5 mils and fiberglass layer 11 may have a thickness of 4 mils. At the portions 12 and 13 of the cards, which will eventually be the copper interconnecting tabs for the inner and outer armature winding conductors, the layer of fiberglass is removed in an elongated, rectangular strip exposing spaced surfaces of copper 10 on the fiberglass side of the cards. FIG. 1 shows a card which has been formed by removing portions of the fiberglass layer after the fiberglass has been laminated to the copper. As an alternative, the original manufacture of the card may be as shown in FIG. 2, with the layer of fiberglass precut to a smaller size than the layer of copper, or, as a further alternative, openings, such as shown in FIG. 1, may be present in the fiberglass layer prior to lamination of the copper and fiberglass. In any case, it is necessary that minimal epoxy flow exist beyond the edge of the fiberglass onto the copper, since this portion of the copper must remain clean for subsequent interconnection of the winding conductors.

Figures 3, 4:
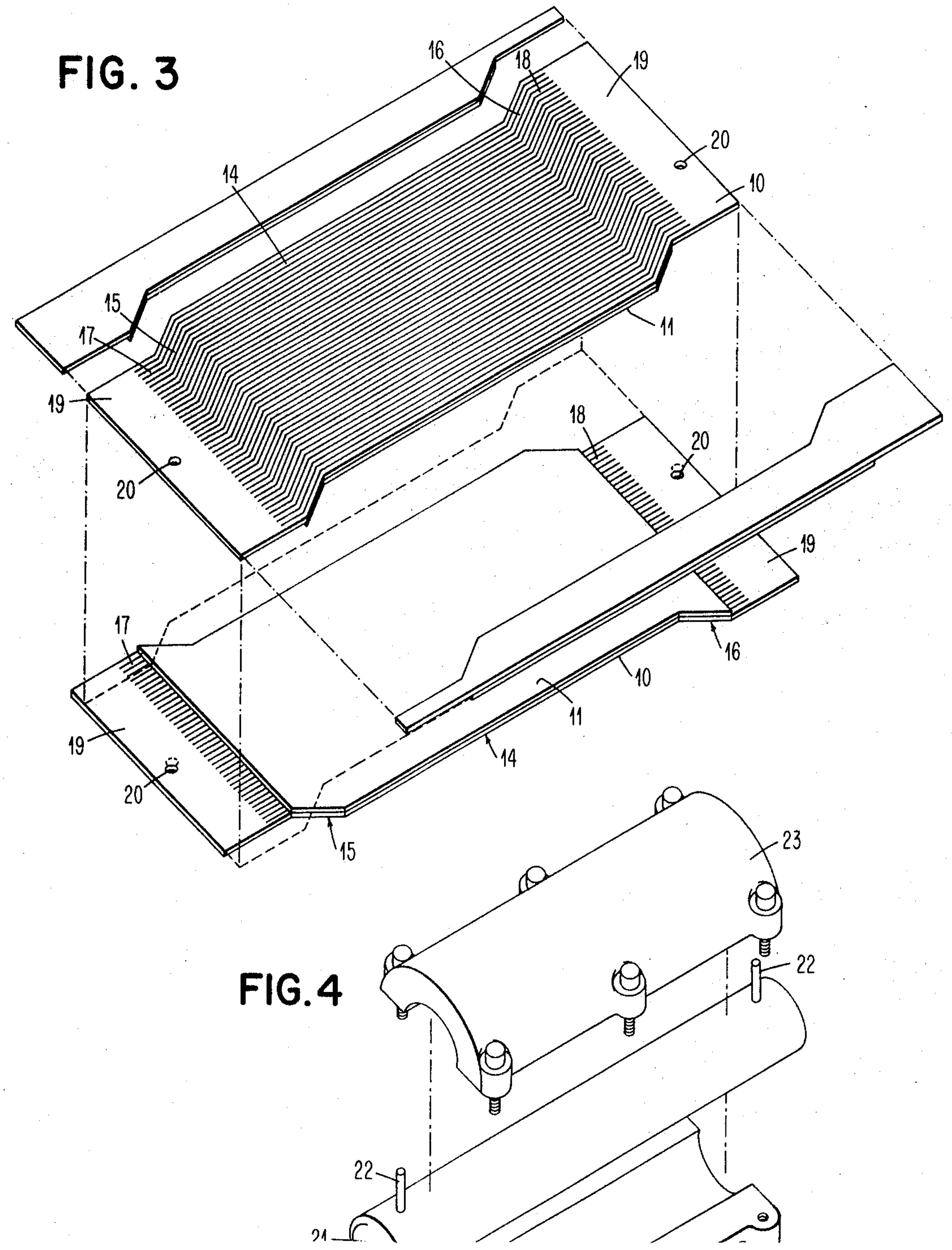
FIG. 3 shows two cards, of the form shown in FIG. 2, with one-half of an armature winding formed in each card.
FIG. 4 is a view of the mandrel and shell.

Each card is now coated with a photo-resist, and is then subjected to photo-etching techniques on the copper side of the card to produce one card having the outer winding conductors and one card having the inner winding conductors. Referring to FIG. 3, an individual conductor consists of a relatively long axially extending portion 14 with oppositely inclined crossover portions 15 and 16 at each end, the crossover portions terminating in short axially extending interconnecting tabs 17 and 18. These tabs are the above mentioned interconnecting tabs which are subsequently used to connect the inner conductors and to the outer conductors. The tabs terminate in a selvage surface 19 which includes copper. After the circuit is formed, the card is cleaned to remove photo-resist, grease, and the like.

The cards are then masked on the fiberglass side, to cover end portions of exposed copper, including interconnecting tabs 17 and 18. The unmasked fiberglass layer of each card is then coated with a thermal activated or setting adhesive. The term thermal activated or setting adhesive as used herein is meant to encompass a means of later bonding the cards together by means of elevated temperature and pressure. For example, a heat reflowable thermoplastic adhesive may be used, or the cards may be coated with epoxy which is then B-staged.

The cards are then cut, as shown in FIG. 3, such that each axially extending edge of the card is bordered by an individual conductor of the armature winding. The ends of the cards include the interconnecting tabs in the crossover portion at the ends of the armature, these tabs being separated by slot shaped openings in the copper, not shown, and terminating in the selvage material which will eventually be discarded. Positioning indicia in the form of manufacturing holes 20 are formed to extend completely through the card. These openings will be subsequently used to position the cards in proper alignment, preformed in a tubular shape on a mandrel.

The two cards are now assembled on a cylindrical mandrel 21 having a high temperature coefficient of expansion. The cards are positioned with the adhesive coated fiberglass surfaces back-to-back. Mandrel 21 may be aluminum or it may be formed of a tetrafloroethylene material which has been pretreated by clamping the material in a shell and subjecting the shell to one or more cycles of an elevated temperature. This pretreatment produces a mandrel with predictable dimension of expansion and contraction.

The mandrel includes positioning indicia in the form of locating pins 22. The cards are assembled on the mandrel with the holes 20 in the cards mating with the locating pins.

Mandrel 21, in a specific embodiment, was constructed as a cylinder of tetrafloroethylene, having a central opening which tightly received a hollow steel rod. Two steel collars were fixed to the rod, one adjacent each end of the cylinder. The locating pins 22 were placed one in each steel collar. The cylinder may also be split, normal to its axis, and a space left at the split to accommodate a slight amount of axial expansion, to thereby reduce axial tensile stress upon the parts being laminated.

The mandrel and cards are then placed in a shell 23, such as Invar, having a low temperature coefficient of expansion. The shell encompasses the mandrel and the cards.

This Invar shell is dimensionally stable throughout a considerable temperature range, and its central tubular-shaped opening thus establishes a stable outer diameter for the finished tube. This diameter is also related to the width of the cards, the card width being selected to establish both the inner diameter and the outer diameter of the tube, as the cards are folled to form the tube with the card edges abutting along axial seams.

Within the technique of this invention, mandrel 31 and shell 23 may be any structure which, as a result of temperature, is activated to mechanically force the cards together.

The composite shell, cards and mandrel structure is now subjected to an elevated temperature for a given time period, is then allowed to cool to room temperature, whereupon the shell is disassembled. The specific elevated temperature and time period is matched to the characteristics of the adhesive and to the differential expansion coefficient of the mandrel and shell. For example, with an 0.8 inch diameter and a 6 inch long armature, the temperature is elevated from ambient temperature to 195° F. in one-half hour, the temperature is then elevated to 325° F. in one-half hour, and is then held at 325° F. for 1 hour. The expansion of the mandrel forces the cards together to form a good mechanical bond between the cards, while the elevated temperature activates the adhesive such that a structurally sound tube results.

An annular commutator portion of the armature winding is next formed. The armature winding is masked so that only an annular band, adjacent one end of the portion 11 of the outer conductors are exposed. An electrode is then attached to the metal selvage material at one end of the armature, and the armature is placed in an electro-plating bath. The plating occurs only on the exposed band of copper circuit material to form a raised commutator surface.

After plating the commutator, the masking is removed, the selvage is cut away, and the interconnecting tabs of the outer circuit are connected to the tabs of the inner circuit, as by welding.

As an alternative to the welding step, and referring to the original cards of FIG. 1, the exposed portion of copper which can be viewed on the fiberglass side of the cards may be coated with a layer of solder. During the photo-etching step, the selected areas of both copper and solder are etched away, leaving solder coated interconnecting tabs. Subsequently, when the two cards are placed in the shell and subjected to the elevated temperature, the expansion of the mandrel forces the tabs together, and the heat melts the solder to connect the inner and outer circuit conductors.

Equivalent steps to these above described will be apparent to those skilled in the art. For example, as mentioned, the photo-etching step produces slot shaped openings in the copper between the interconnecting tabs of each card. These openings can be used as locating indicia, rather than holes 20 in the selvage material. Also, the term photo-etching technique suggests other known means of forming a conductor pattern out of a solid sheet of metal, as by cutting or scribing. It is also within the teaching of this invention to position one card upon the other so that the straight portion 14 of each conductor in the outer card is either directly above a conductor in the inner card, or is alternatively circumferentially spaced between the conductors in the inner card. In this latter case, the resulting tubular armature will have a corrugated cross sectional shape in this portion of the armature.

While the invention has been particularly shown and described with reference to preferred embodiments thereof, it will be understood by those skilled in the art that various changes in form and details may be made therein without departing from the spirit and scope of the invention.

What is claimed is:

1. The method of manufacturing a tubular printed circuit armature for use with an electrical machine, comprising the steps of;

preparing at least two laminated cards having a layer of electrically conductive metal bonded to a patterned flexible layer of electrical insulation, the pattern in said layer of insulation providing spaced surfaces of exposed metal layer on the insulation side of the cards, coating at least one side of one card with a layer of thermal activated adhesive, such that said spaced surfaces of said metal layer remain uncoated, placing said cards about a mandrel such that (a) said one side of said one card is adjacent the other card, (b) said spaced surfaces of said metal layer in each of said cards are in alignment, and (c) said cards overlap to form a double card thickness at the central portion and a single card thickness at each end portion, the end portions then overlapping to form an axial seam in the tube which is thus formed about said mandrel, placing said mandrel, with said cards wrapped thereon, into an encircling shell, said mandrel and shell being constructed and arranged to constitute a thermal activated jig, subjecting said jig to an elevated temperature to activate said jig and thus force said cards mechanically together, and to activate said adhesive, and removing said mandrel from said shell.

2. The method as defined in claim 1 wherein said mandrel and said shell are constructed and arranged to have different temperature coefficients of expansion.

3. The method as defined in claim 2 wherein thermal setting adhesive is coated in a controlled amount, such that said adhesive does not appreciably flow out from between said cards due to said force and said temperature.

4. The method as defined in claim 2 including the additional step of coating the exposed surface of the metal layer of at least one of said cards with a solder-like material which subsequently melts at said elevated temperature.

5. The method as defined in claim 2 wherein, prior to the step of coating with said adhesive, said cards are processed to produce a plurality of individual armature conductors in the metal layer, each of said individual conductors terminating in said spaced surfaces of said metal layer, and wherein said cards are placed on said mandrel in a manner such that the terminating portion of a conductor in one card overlaps the terminating portion of a conductor of the other card.

6. The method as defined in claim 5, wherein, after said mandrel is removed from said shell, said overlapping terminating portions of said conductors are electrically attached.

7. The method as defined in claim 6 wherein said cards include selvage material at the ends of each card adjacent said spaced surfaces of said metal layer, and including the step of forming manufacturing holes in said selvage material, and aligning said manufacturing holes with indicia carried by one member of said jig.

8. The method as defined in claim 5 wherein said cards include positioning indicia and including the step of aligning said indicia in order to achieve said overlapping of the terminating portions of said conductors.

9. The method as defined in claim 8, including the additional steps of;

masking the outer conductors of said armature in a manner to form an exposed annular band of unmasked conductors, and depositing a commutator surface of conductive metal on said unmasked conductors.

10. The method as defined in claim 9, wherein said commutator surface is deposited by the additional steps of;

attaching an electrode to selvage metal at one end of said armature, and electroplating said commutator surface on said unmasked conductors.

11. The method as defined in claim 2 wherein, prior to the step of coating with thermal setting adhesive, each card is coated with a photo-resist, the conductive metal side of each card is then subjected to a photoetching technique to produce one-half of an armature winding on each card and to produce interconnecting tabs in said spaced surfaces of metal, cleaning the cards, masking the cards on the electrical insulation side to cover the exposed interconnecting tabs, then coating the electrical insulating side of both cards with said adhesive, and removing the masking from the interconnecting tabs.

12. The method defined in claim 11 wherein said interconnecting tabs terminate in selvage material, and including the steps of forming manufacturing holes in said selvage material, and aligning said manufacturing holes with positioning indicia carried by said mandrel such that the interconnecting tabs of each card are aligned.

13. The method defined in claim 12 including the steps of masking the outer conductors of said armature after said mandrel is removed from said shell to form an exposed annular commutator band of unmasked conductors, attaching an electrode to the selvage metal, electro-plating said commutator band, removing said selvage material and electrically connecting said interconnecting tabs.

14. The method as defined in claim 1 wherein said shell is constructed of a material which experiences a minimal dimensional change while being subjected to said elevated temperature.

* * * * *